US005516987A

United States Patent [19]

Itoh et al.

[11] Patent Number: 5,516,987

[45] Date of Patent: May 14, 1996

[54] SOLID INSULATOR AND METHOD OF MANUFACTURING THE SAME

[75] Inventors: Hiromu Itoh, Kasugai; Makio Yamaguchi; Naohito Itoh, both of Nagoya; Takao Nakai, Inazawa; Shigeo Mori, Kuwana, all of Japan

[73] Assignee: NGK Insulators, Ltd., Japan

[21] Appl. No.: 244,335

[22] PCT Filed: Sep. 21, 1993

[86] PCT No.: PCT/JP93/01354

§ 371 Date: May 24, 1994

§ 102(e) Date: May 24, 1994

[87] PCT Pub. No.: WO94/08345

PCT Pub. Date: Apr. 14, 1994

[30] Foreign Application Priority Data

| | | | |
|---|---|---|---|
| Sep. 25, 1992 | [JP] | Japan | 4-256230 |
| Sep. 25, 1992 | [JP] | Japan | 4-256299 |
| Dec. 16, 1992 | [JP] | Japan | 4-335765 |

[51] Int. Cl.$^6$ ..... C04B 35/64

[52] U.S. Cl. ..... 174/142; 264/66

[58] Field of Search ..... 174/142; 264/66

[56] References Cited

U.S. PATENT DOCUMENTS

| | | | |
|---|---|---|---|
| 3,723,593 | 3/1973 | Ono | 264/66 X |
| 4,659,680 | 4/1987 | Guile | 264/66 X |
| 4,866,014 | 9/1989 | Cassidy et al. | 264/66 X |
| 5,425,909 | 6/1995 | Fu et al. | 264/66 X |

FOREIGN PATENT DOCUMENTS

| | | |
|---|---|---|
| 217356 | 8/1990 | Japan . |

*Primary Examiner*—Kristine L. Kincaid
*Assistant Examiner*—Paramita Ghosh
*Attorney, Agent, or Firm*—Parkhurst, Wendel & Burr

[57] ABSTRACT

The present invention is relates to a high strength solid insulator, and a method of manufacturing the same. The solid insulator is made of cristobalite porcelain containing cristobalite crystals in an amount of less than 10%, in which internal strain in the direction of compression in a columnar insulator body is larger in the diametrically outer portion thereof than in the diametrically inner portion thereof, and the difference Y in internal strain between the outer peripheral portion and diametrically central portion of the insulator body is defined by $Y \geqq (1.76 \times 10^{-6})$ X, wherein X (mm) represents the diameter of the insulator body. The method of manufacturing the solid insulator is characterized in that a sintered insulator body is quenched to increase the difference in internal strain between the inner and outer portions of the insulator body.

2 Claims, 16 Drawing Sheets

SOLID INSULATOR AND METHOD OF MANUFACTURING THE SAME

FIELD OF THE INVENTION

The present invention relates to a solid insulator and a method of manufacturing the same.

PRIOR ART

In the technical field of this kind of solid insulator, there have been developed a solid insulator made of cristobalite porcelain containing cristobalite crystals, and a solid insulator made of non-cristobalite porcelain without any cristabalite crystal or the like. In these solid insulators, high mechanical strength and electrical strength are required.

The former solid insulator made of cristobalite porcelain containing cristobalite crystals in an amount of more than 20 wt % is superior in strength to a solid insulator made of cristobalite porcelain containing cristobalite crystals in an amount of less than 10 wt %, the latter solid insulator made of non-cristobalite porcelain or the like. From the manufacturing point of view, however, the latter solid insulator made of non-cristobalite porcelain is superior to the former solid insulator since the sintering temperature can be easily controlled in a wide range during the firing process.

A method for increasing strength of insulators is disclosed on pages 1260 to 1261 of "Ceramics Industry Engineering Handbook" issued by Gihodo, Feb. 15, 1971. In such a method for increasing strength of insulators, a raw material easier for forming cristobalite crystals is used as a raw material of the insulator body, and a firing condition easier for forming the cristobalite crystals is adapted to increase the thermal expansion coefficient of the insulator body more than that of a glaze layer on the surface of the insulator during the sintering process, thereby causing compressive stress in the glaze layer during the cooling process for increasing the tensile stress and bending strength of the insulator by 10 to 40%.

In the solid insulator made of cristobalite porcelain containing cristobalite crystals in an amount of more than 20 wt %, the foregoing method is useful for increasing the thermal expansion coefficient of the insulator body during the sintering process. In the solid insulator containing cristobalite crystals in an amount of less than 10 wt % or the solid insulator made of non-cristobalite porcelain, however, the thermal expansion coefficient of the insulator body may not be increased during the firing process. It is, therefore, difficult to adjust the thermal expansion coefficient of glaze for increasing a difference in thermal expansion coefficient between the insulator body and the glaze layer. For this reason, the foregoing method is useless in manufacturing of the latter solid insulator. Since the glaze layer formed on the surface of the insulator is extremely thin in thickness, the glaze layer is damaged when slightly cracked during handling of the insulator products. For this reason, the foregoing method is not always useful in manufacturing of the former solid insulator made of cristobalite porcelain containing a large amount of cristobalite crystals.

SUMMARY OF THE INVENTION

It is, therefore, an object of present invention to provide a high strength solid insulator made of cristobalite amount of less than 10% wt % or made of non-cristobalite porcelain, and a method of manufacturing the high strength solid insulator.

MEANS FOR SOLVING THE PROBLEM:

According to the present invention, there is provided a solid insulator made of cristobalite porcelain containing cristobalite crystals in an amount of less than 10 wt % or made of non-cristobalite porcelain in which internal strain of a columnar body of the insulator in the direction of compression is larger in the diametrically outer portion thereof than in the diametrically inner portion thereof, and in which a difference Y between the internal strain in the diametrically outer portion of the columnar insulator body and that in the diametrically central portion thereof is determined to be $Y>(1.76\times10^{-6})X$, where X(mm) represents the diameter of the columnar insulator body and is determined to be $20\leqq X\leqq 250$.

In the present invention, the internal strain is measured by the following method:

The insulator body is cut out in round with a predetermined thickness at a central portion thereof in a longitudinal direction, and a plurality of strain gauges of the electric resistance type are affixed to the cross-section of the cut piece with a predetermined space on its diametrical direction. Thereafter, the cut piece is cut out at the affixed positions of tile respective strain gauges to provide plate samples respectively in tile form of a block of 10 mm in length and width and 5 mm in thickness. Thus, each expansion amount of the plate samples in the circumferential length thereof is measured by the respective strain gauges, and the expansion amount per a unit length is measured as internal strain in the respective portions.

The manufacturing method of the solid insulator comprises the steps of sintering an unburned solid insulator body at a predetermined sintering temperature higher than 1000° C. and cooling the sintered solid insulator body, wherein the cooling step is divided into a first cooling temperature region of from the sintering temperature to 600° C., a second cooling temperature region of from 600° C. to 500° C., and a third cooling temperature region of from 500° C. to room temperature. Thus, an average cooling speed Za (°C./hr) at the first cooling temperature region is determined in relation to the diameter X (mm) of the insulator body in a range defined by the following formula:

$$-1.0X+400\leqq Za\leqq -2.4X+900$$

An average cooling speed Zb (°C./hr) at the second cooling temperature region is determined in a range defined by the following formula:

$$-0.25X+80\leqq Zb\leqq -0.45X+160$$

An average cooling speed Zc (° C./hr) at the third cooling temperature region is determined in a range defined by the following formula:

$$Zb\leqq Zc$$

When the solid insulator is applied with a bending load from the exterior, a tensile stress acts on the surface of the insulator at the side applied with the bending load, while a compressive stress acts on the surface of the insulator at the opposite side. Thus, the surface of the insulator starts to be damaged at a portion applied with a maximum tensile stress. If in this instance there is internal strain in the surface of the insulator in the direction of compression, the internal strain resists against the tensile stress caused by the bending load applied from the exterior and moderates the tensile stress to enhance the strength of the solid insulator.

In the solid insulator of the present invention, the difference Y in internal stress between the diametrically outer portion of the insulator body and the diametrically central portion thereof is represented by the formula $Y \geqq (1.76\times10^{-6}) X$ and causes large internal strain in the surface of the insulator body in the compression direction. Thus, such large internal strain acts to moderate the tensile stress acting on the surface of the insulator and to enhance strength of the insulator. In the solid insulator, the internal strain exists not only in the surface of the insulator but also increases from the internal portion of the insulator to the outer peripheral portion thereof. Thus, the fracture strength of the insulator is ensured even if the surface of the insulator is damaged. This is useful to maintain the high strength of the solid insulator.

In the manufacturing method of the present invention, the insulator body is cooled at the average cooling speeds Za, Zb and Zc after being sintered during the sintering step. Thus, the sintered insulator body is quenched without the occurrence of any cooling crack caused by excessive increase of the internal stress therein, and such quenching of the insulator body is useful to increase the difference of the internal strain in the direction of compression.

That is to say, the average cooling speed Za at the first cooling temperature region from the sintering temperature to 600° C. is extremely higher than a conventional average cooling speed of from 50° C. to 100° C./hr. Thus, the difference in temperature between the internal portion and outer portion of the insulator body during the cooling process becomes large, and the outer peripheral portion of the insulator body is solidified in a condition where the internal portion of the insulator body is still maintained in a molten condition. Thereafter, the internal portion of the insulator body is gradually solidified and contracted. As a result, an internal stress remains in the outer peripheral portion of the insulator body to cause large internal strain in the direction of compression.

At the second cooling temperature region from 600° C. to 500° C., the quartz in the insulator body is transformed from the β type to the α type to rapidly change the thermal expansion coefficient of the insulator body. As a result, the internal stress of the insulator body increases to cause cooling cracks in the insulator body. For this reason, the average cooling speed Zb at the second cooling temperature region is determined to be equal to or slightly larger than the conventional cooling speed to avoid the occurrence of cooling cracks.

At the third cooling temperature region from 500° C. to the room temperature, annealing of the insulator body becomes unnecessary in case the foregoing cooling conditions are adapted. Thus, the average cooling speed Zc at the third cooling temperature region may be adjusted to be equal to or larger than the average cooling speed at the second cooling temperature region. It is, therefore, possible to economically manufacture a high strength solid insulator with a larger difference in internal strain between the internal and outer portions of the insulator body.

DETAILED DESCRIPTION OF THE INVENTION

Relationship between internal strain and strength

EXAMPLE 1

A between internal strain and strength of the insulator will now be explained.

Figure 1:
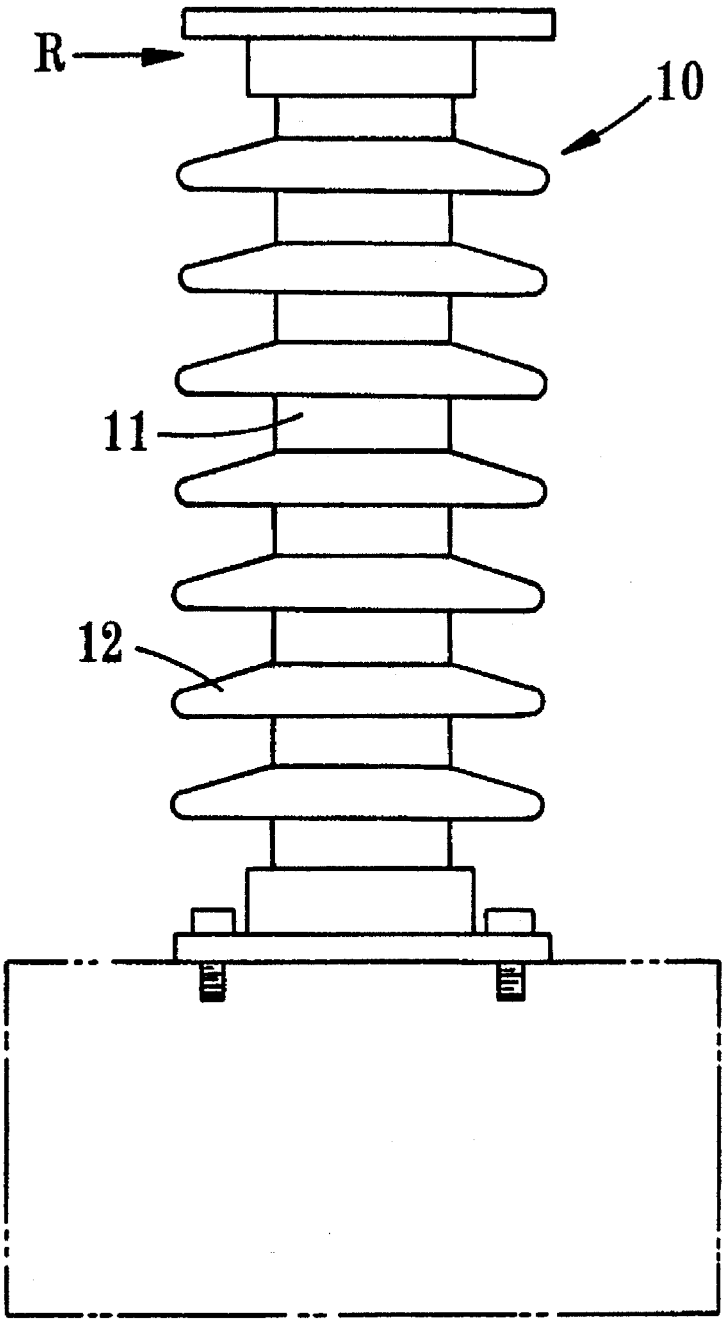
FIG. 1 is a side view of a solid Insulator to which is adapted the present invention.

In FIG. 1 of the drawings, there is illustrated a solid insulator 10 to which the present invention a adapted. The solid insulator 10 is made of non-cristobalite porcelain, which is manufactured by forming an insulator body using a raw material consisting of 20–40 wt % silica sand, 20–40 wt % feldspar and 40–60 wt % clay, and firing the insulator body under various conditions. The component of the porcelain consists of 10–20 wt % quartz, 8–20 wt % mullite and 50–70 wt % glass. The solid insulator has a solid columnar insulator body 11 formed with a plurality of equally spaced umbrella portions 12. In this embodiment, the diameter of the insulator body 11 is determined to be 85 mm.

Manufacturing Condition

Figure 2:
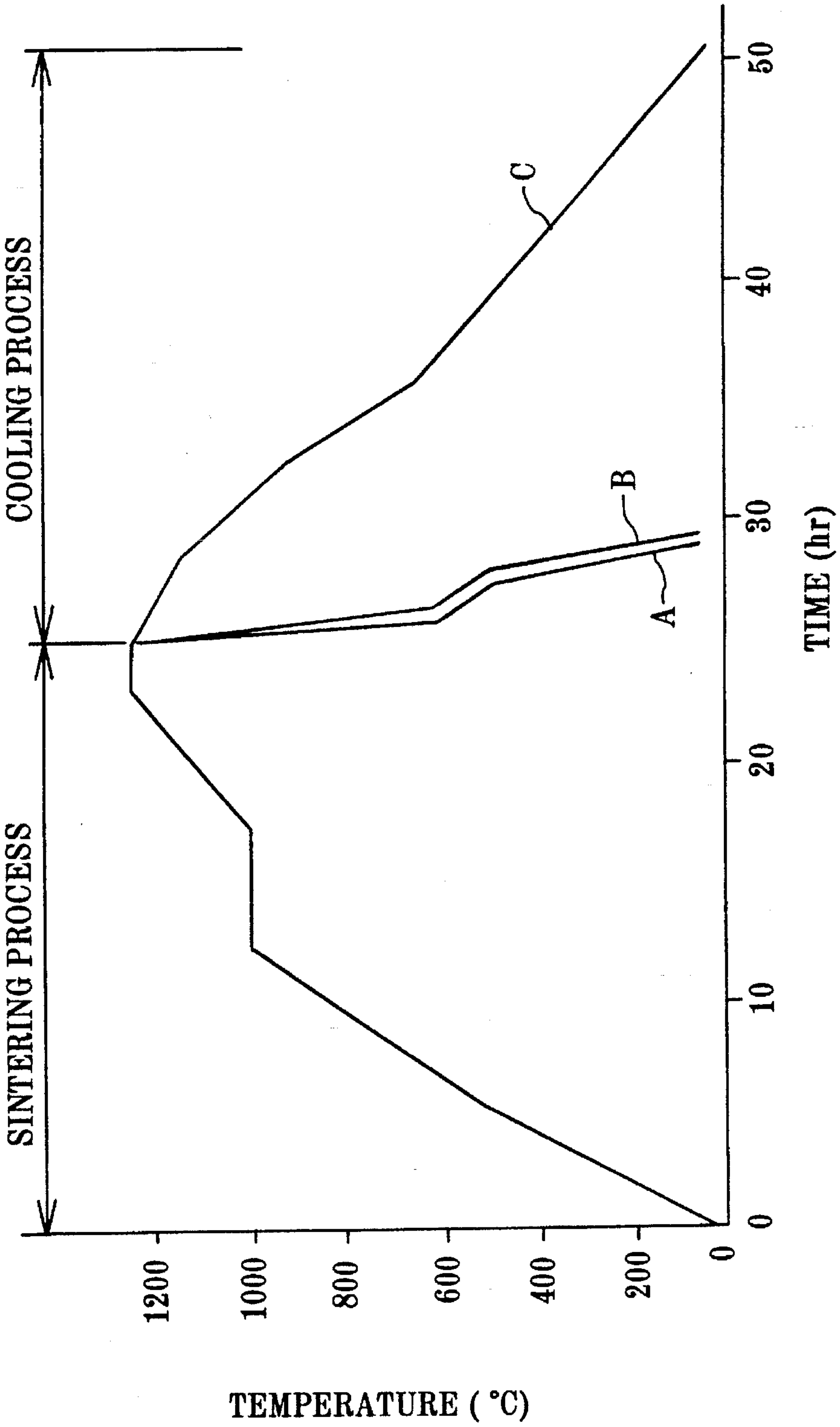
FIG. 2 is a graph showing heating and cooling curves at sintering and cooling processes in manufacturing of solid insulators.

In FIG. 2, there are illustrated three kinds of methods A, B, C for manufacturing the solid insulator 10, wherein the sintering of the insulator bodies was carried out under the same condition while the cooling of the insulator bodies was carried out under different conditions. During the sintering process in the respective manufacturing methods, the insulator bodies were heated up to 300° C. Within three hours from the time heating started. Thereafter, the insulator bodies were heated up to 500° C. within two hours and heated up to 1000° C. within seven hours. Subsequently, the insulator bodies were retained at 1000° C. for five hours and heated up to 1250° C. during within five and one-half hours. Thereafter, the insulator bodies were retained at 1250° C. for two hours. The sintered insulator bodies were cooled to room temperature under various conditions described below.

In the cooling process of the manufacturing method A, an average cooling speed of the sintered insulator body was controlled to be 600° C./hr at a first cooling temperature region from the sintering temperature to 600° C., to be 70° C./hr at a second cooling temperature region from 600° C. to 500° C. and to be 250° C./hr at a third cooling temperature region from 500° C. to room temperature. In the cooling process of the manufacturing method B, an average cooling speed of the sintered body was controlled to be 400° C. at the first cooling temperature region from the sintering temperature to 600° C., to be 70° C./hr at the second cooling temperature region of from 600° C. to 500° C. and 250° C./hr at the third cooling temperature region from 500° C. to room temperature. These average cooling speeds are extremely greater than those in a conventional cooling process.

On the contrary, the cooling speed of sintered insulator body during the cooling process in manufacturing method C was controlled to be in an annealing range smaller than the cooling speeds in the manufacturing methods A and B. That is to say, the average cooling speed of the sintered insulator body was controlled to be 30° C./hr at a first cooling temperature region from the sintering temperature to 1150° C., to be 55° C./hr at a second cooling temperature region from 1150° C. to 950° C., to be 80° C./hr at a third cooling temperature region from 950° C. to 650° C. and to be 40° C./hr at a fourth cooling temperature region from 650° C. to the room temperature.

Measurement of Internal Strain

Figure 3A:
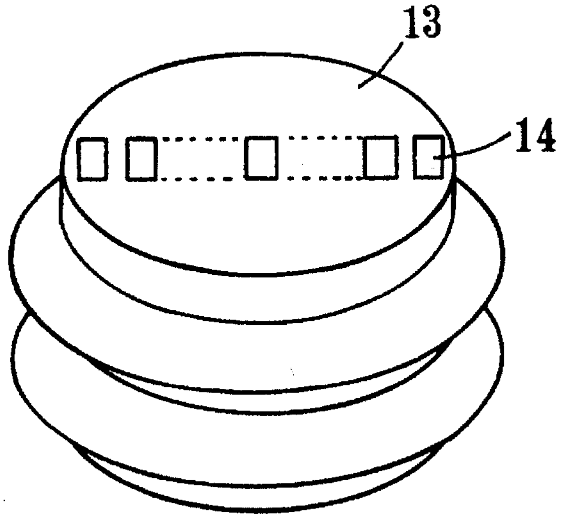
FIG. 3 illustrates a measuring method of internal strain in an insulator body, wherein FIG. 3 (*a*) is a perspective view illustrating strain gauges affixed to a cross section of a cut piece cut out from the insulator body, and FIG. 3 (*b*) is a perspective view illustrating a plate sample cut out from the cut piece at affixed position of strain gauges.
Figure 3B:
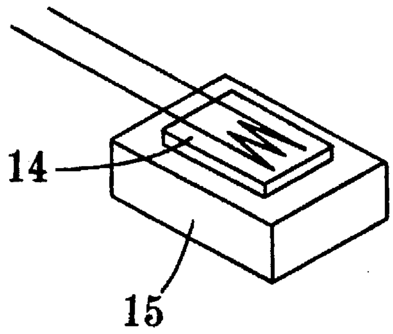
Figure 4:
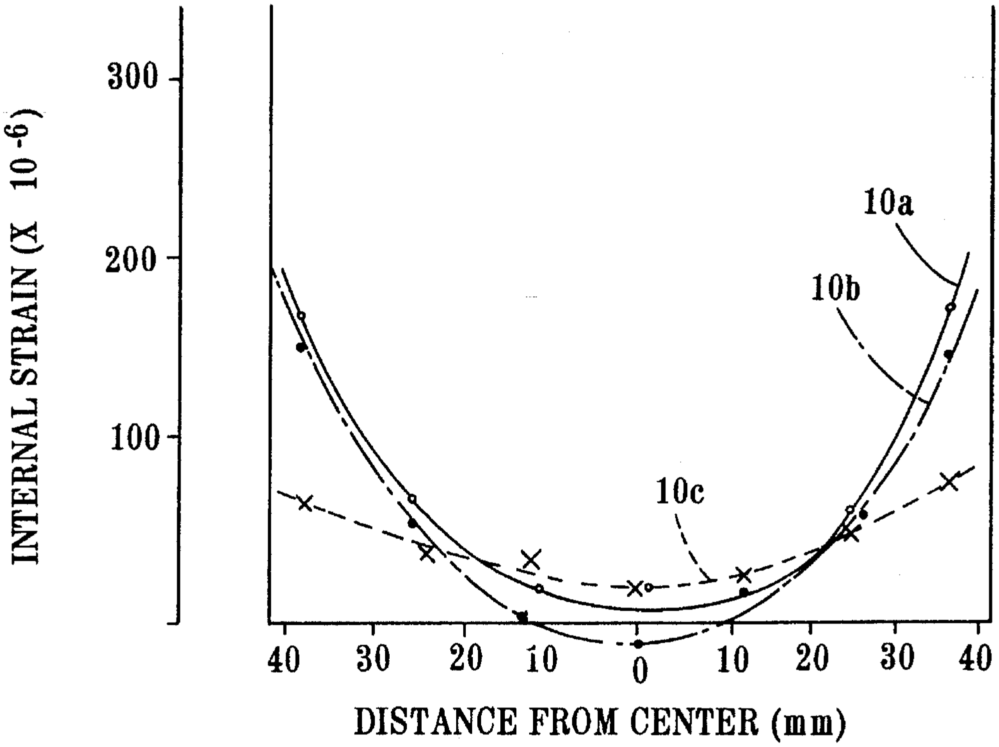
FIG. 4 is a graph showing internal strain in respective portions of the insulator body.

In FIGS. 3(*a*) and 3(*b*), there is illustrated a measuring method of internal strain in the diametrical direction in respective portions of the solid insulators 10*a*, 10*b*, 10*c* manufactured by manufacturing methods A, B and C. In FIG. 4 there is shown internal strain measured by the measuring method. The measuring method of internal strain was invented by the inventors, wherein each central portion of the insulator bodies was cut out to provide a cut piece with two umbrella portions as shown in FIG. 3(*a*), and a plurality of strain gauges 14 were affixed to a cross-section of the cut piece 13 with a predetermined space in its diametrical direction. The outermost strain gauges 14 are located in a position spaced in 5 mm from the outer periphery of the cross-section toward the center of the same.

The strain gauges 14 each are of the electric resistance type, and each value of the strain gauges 14 was adjusted to be a standard value of zero. The cut pieces each were cut out at the affixed positions of the respective strain gauges 14 to provide plate samples 15 respectively in the form of a block of 10 mm in length and width and 5 mm in thickness as shown in FIG. 3 (*b*). Thus, each expansion amount of the plate samples 15 in the circumferential length thereof was measured by the respective strain gauges 14, and the expansion amount per a unit length was measured as internal strain.

FIG. 4 is a graph showing each internal strain in the respective portions of the cut pieces, wherein the internal strain is small in the internal portion of the insulator body and becomes gradually larger in the outer portion of the insulator body. In the solid insulators 10*a*, 10*b* manufactured by the manufacturing methods A and B, a difference in internal strain between the internal and outer portions of the insulator becomes extremely large. On the contrary, in the solid insulator 10*c* manufactured by manufacturing method C, a difference in internal strain between the internal and outer portions of the insulator becomes extremely small. The cut pieces of the solid insulators used for measurement of the internal strain were placed in a condition where the internal stress of the cut pieces was more released than that in the insulator body. Accordingly, although each absolute value of tile measured internal strain is different from each absolute value of true internal strain in the insulator body, the measured internal strain is deemed as a proper value in evaluation of the difference in internal strain between tile internal and outer portions of the insulator.

Measurement of Strength

Figure 5:
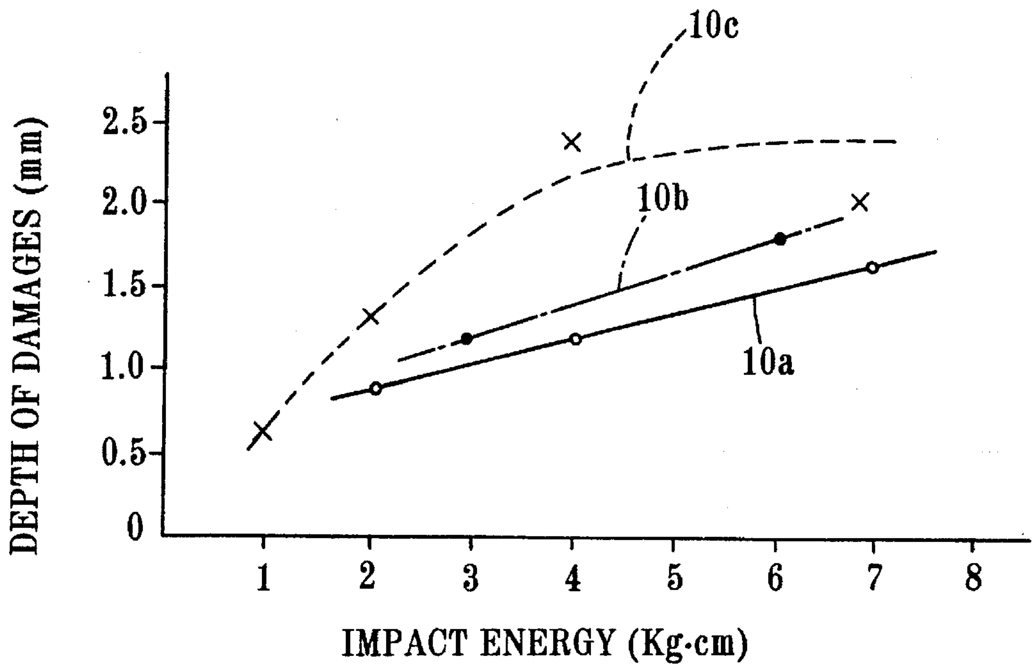
FIG. 5 is a graph showing a relationship between impact energy applied to each surface of insulator bodies and depth of damages.
Figure 6:
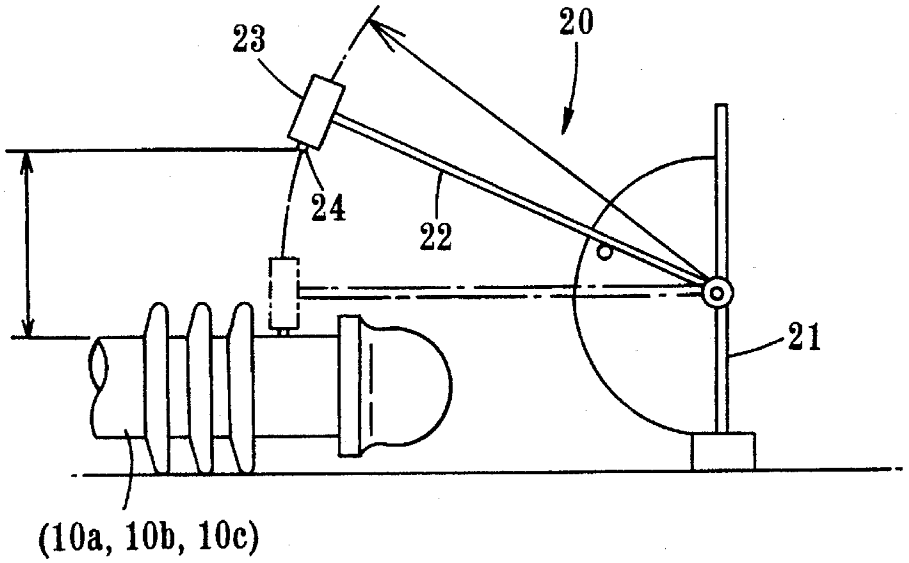
FIG. 6 is a schematic Illustration of a damage apparatus.

In FIG. 5 there are illustrated damaged conditions of the surface of the respective solid insulators 10*a*, 10*b*, 10*c* which were measured by use of a damage apparatus 20 shown in FIG. 6. The damage apparatus 20 has an arm member 22 rotatably supported on a central portion of a support pillar 21 to be movable in a vertical direction and a hammer 23 mounted on a distal end of the arm member 22. The hammer 23 has a ball 24 of tungsten secured to its lower end. The length of arm member 22 is 330 mm, the weight of hammer 23 is 133 g and the radius of tungsten ball 24 is 5 mm. The hammer 23 is arranged to be dropped from an appropriate height to damage the surface of the insulator body.

To measure the extent of damage, the solid insulators 10*a*, 10*b*, 10*c* each were laterally placed on a support structure of the damage apparatus 20, and the hammer 23 was dropped on each surface of the insulators 10*a*, 10*b*, 10*c* from a predetermined height. Thus, depth of the damages was measured in relation to an impact energy of the hammer 23 as shown in the graph of FIG. 5. As is understood from the graph of FIG. 5, the extent of damage on the insulators 10*a*, 10*b* manufactured under the quenching condition is small, whereas the extent of damage on the insulator 10*c* manufactured under the annealing condition is larger than that on the insulators 10*a*, 10*b*. From this result, it has been found that the surface strength of the insulators 10*a*, 10*b* is higher than that of the insulator 10*c*.

Figure 7:
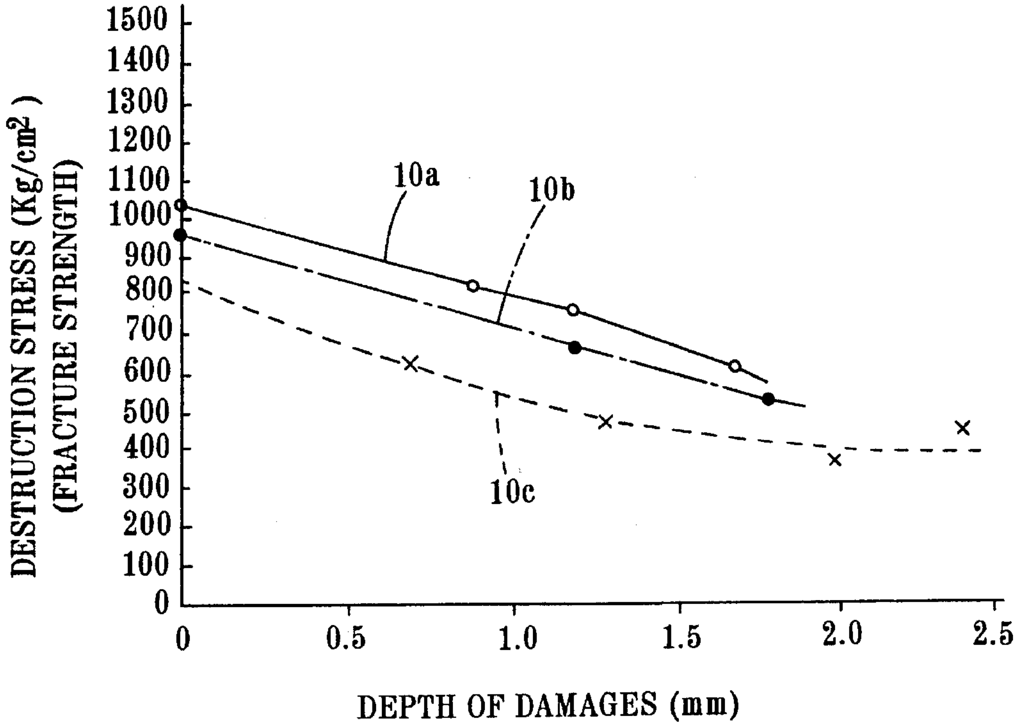
FIG. 7 is a graph showing a relationship-between the depth of the damages on each surface of the insulator bodies and destruction stress (fracture strength)

In FIG. 7, there is illustrated a relationship between depth of the damages on the respective insulators 10*a*, 10*b*, 10*c* and destruction stress therein. For measurement of the destruction stress, the solid insulators each were placed in an upright position as shown in FIG. 1 and applied at its upper end with an external force R from one side. Thus, the external force R in destruction of the respective solid insulators was measured. In this instance, the external force R acts as a tensile stress at one side of the insulator and acts as a compressive stress at the other side of the solid insulator. As a result, the solid insulator is destructed at its damaged portion by a maximum tensile stress acting thereon. The destruction stress is called a damage strength in the present invention.

Figure 8:
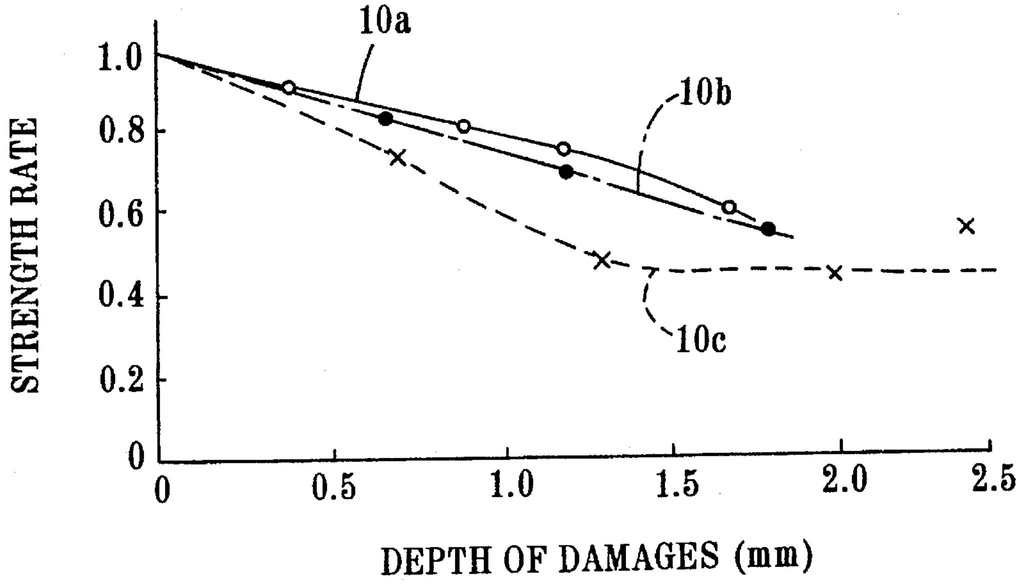
FIG. 8 is a graph showing a relationship between the depth of the damages on each surface of the insulator bodies and each strength rate of the insulator bodies.

As is understood from FIG. 7, the damage strength of the solid insulators 10*a*, 10*b* manufactured under the quenching condition becomes high irrespectively of depth of tile damage, whereas the damage strength of the solid insulator 10*c* manufactured under the annealing condition becomes lower than that of the solid insulators 10*a*, 10*b*. FIG. 8 is a graph wherein the damage strength of the solid insulators relative to a fracture strength in a non-damaged condition is shown as a strength rate. In such a strength rate, a tendency similar to the damage strength has been found. As is understood from the strength rate, the deterioration rate of strength of the solid insulators 10*a*, 10*b* relative to the strength in the non-damaged condition becomes small.

Evaluation

From the results described above, the following facts have been confirmed. In the case that a large internal strain exists in the outer portion of the solid insulator in the direction of compression, the extent of damage on the surface of the solid insulator becomes small, and deterioration of the fracture strength (deterioration of the strength rate) at the damaged portion becomes small even if the surface of the solid insulator is damaged. Accordingly, even if the surface of the solid insulator is carelessly damaged by a tool during handling of the insulator at an assembly process, deterioration of the strength of the insulator is restrained to reduce the occurrence rate of inferior goods of the insulator.

EXAMPLE 2

A relationship among the diameter of the insulator body, the difference in internal strain and strength of the insulator body will now be explained.

Various kinds of insulator bodies different in diameter were sintered and cooled under the same condition as in the Example 1 except for the cooling speed at the cooling process to manufacture various kinds of solid insulators different in diameter and internal strain. Thus, the strength of the respective solid insulators was measured in relation to the diameter of the solid insulator and the difference in internal strain between the diametrically central portion and outer portion of the solid insulator.

Relationship between the difference in internal strain and the strength rate

Figure 9:
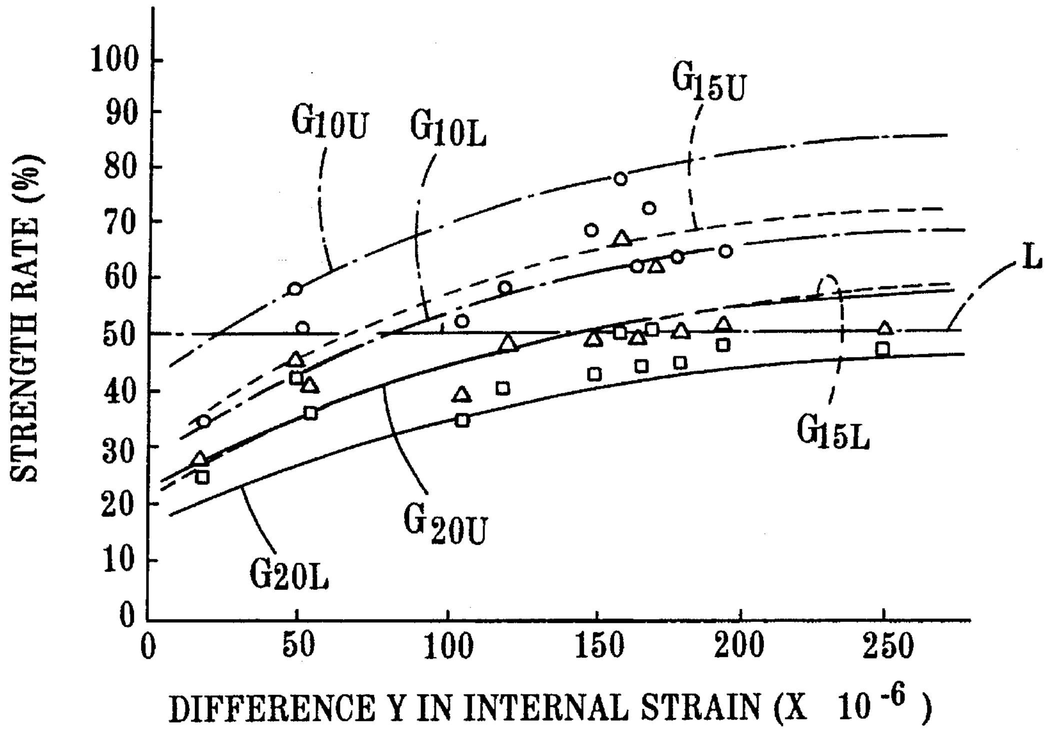
FIG. 9 is a graph showing a relationship between the difference in internal strain In the insulator bodies and the strength rate thereof.

In FIG. 9 there is illustrated a relationship between a difference in internal strain and a strength rate (a damage strength/strength in a non-damaged condition) in respective insulator bodies of 85 mm in diameter and different in internal strain the surfaces of which were applied with damages of 1.0 mm, 1.5 mm and 2.0 mm in depth by using the damage apparatus shown in FIG. 6. In FIG. 9, "○" points represent the insulator bodies with a damage of 1.0 in depth, "Δ" points represent the insulator bodies with a damage of 1.5 mm in depth, square points represent the insulator bodies with a damage of 2.0 mm in depth. In addition, curved lines G10L, G10U represent upper and lower limits of the strength rate of the insulator bodies applied with the damage of 1.0 mm in depth, curved lines G15L, G15U represent upper and lower limits of the strength rate of the insulator bodies applied with the damage of 1.5 mm in depth, and curved lines G20L, G20U represent upper and lower limits of the strength rate of the insulator bodies applied with the damage of 2.0 mm in depth. From the curved lines in FIG. 9, it will be understood that the strength rate becomes high in accordance with increase of the difference in internal strain irrespectively of depth of the damages. In FIG. 9, the strength rate of 50% is indicated by a dot and dash line L since a strength rate more than 50% is better in the insulator bodies with the damage of 1.5 mm in depth in actual practices.

Figure 10:
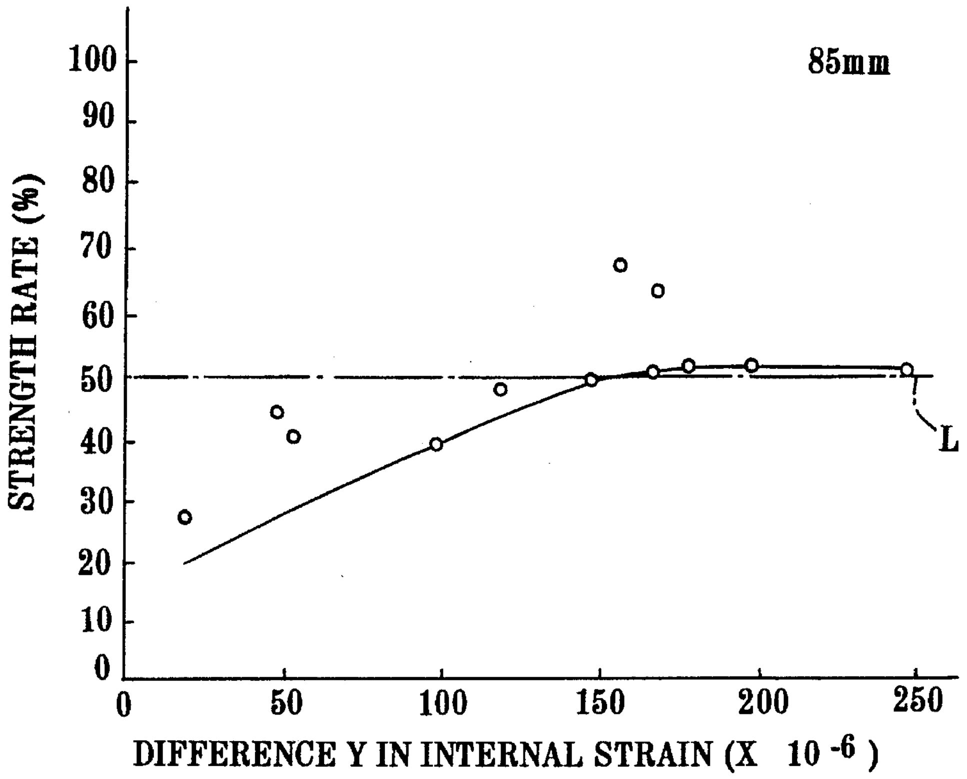
FIG. 10 is a graph showing the difference in internal strain in the Insulator body of 85 mm in diameter and the strength rate thereof.
Figure 11:
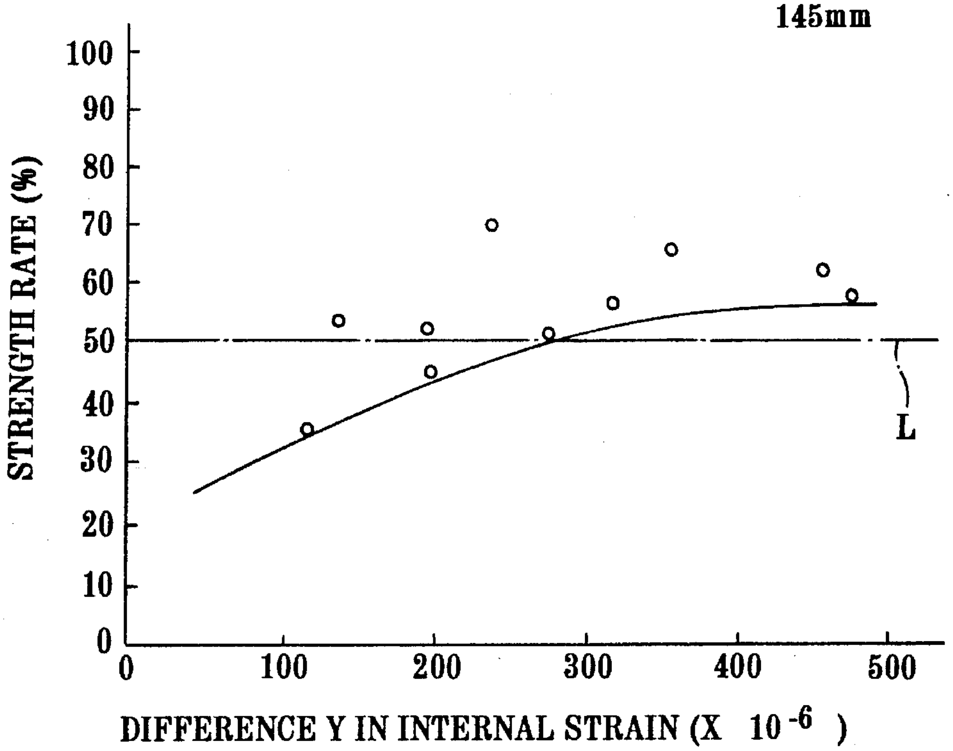
FIG. 11 is a graph showing a relationship between the difference in internal strain in the insulator body of 145 mm in diameter and the strength rate thereof.
Figure 12:
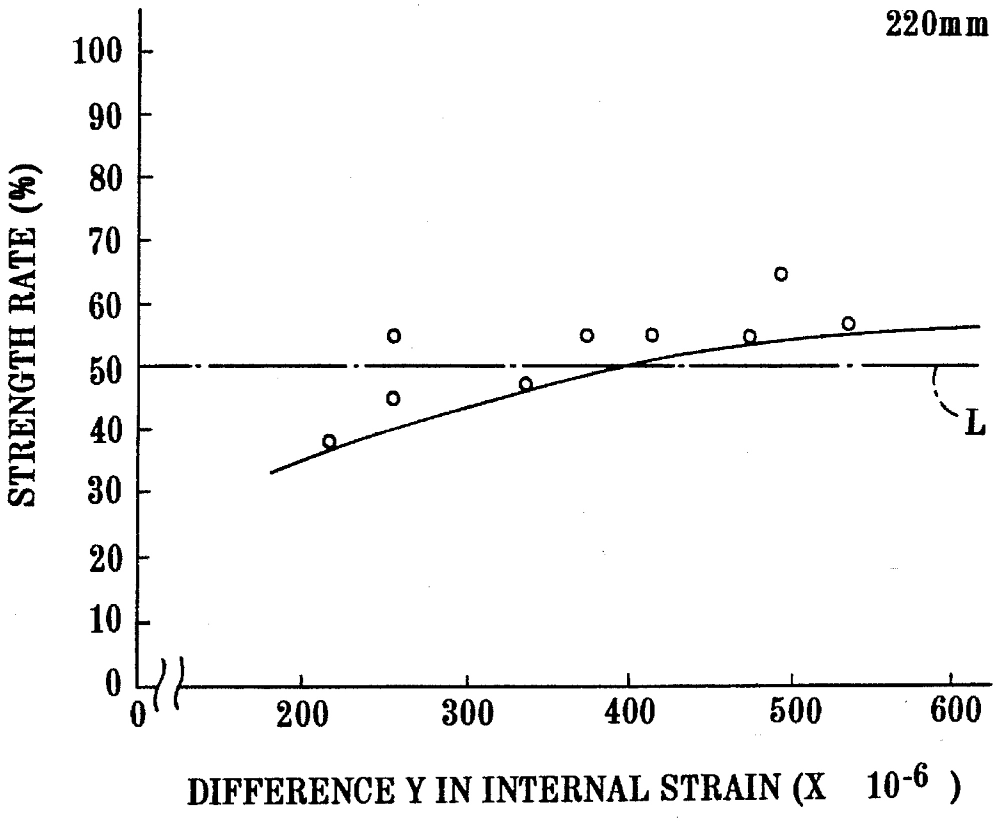
FIG. 12 is a graph showing a relationship between the difference in internal strain in the insulator body of 220 mm in diameter and the strength rate thereof.

Relationship between the difference in internal strain and the strength rate in respective diameters In FIGS. 10, 11 and 12, there is illustrated a relationship between the difference in internal strain and the strength rate in the insulator bodies respectively of 85 mm, 145 mm and 220 mm in diameter and applied with a damage of 1.5 mm in depth. In each graph of FIGS. 10, 11 and 12, the strength rate of 50% is represented by a dot and dash line L. From the graphs of FIGS. 10, 11 and 12, it will be understood that a strength rate of more than 50% is obtained respectively in the case that the difference in internal strain is more than $150\times10^{-6}$ in the insulator bodies of 85 mm in diameter, more than $270\times10^{-6}$ in the insulator bodies of 145 mm in diameter or more than $390\times10^{-6}$ in the insulator bodies of 220 mm in diameter.

Figure 13:
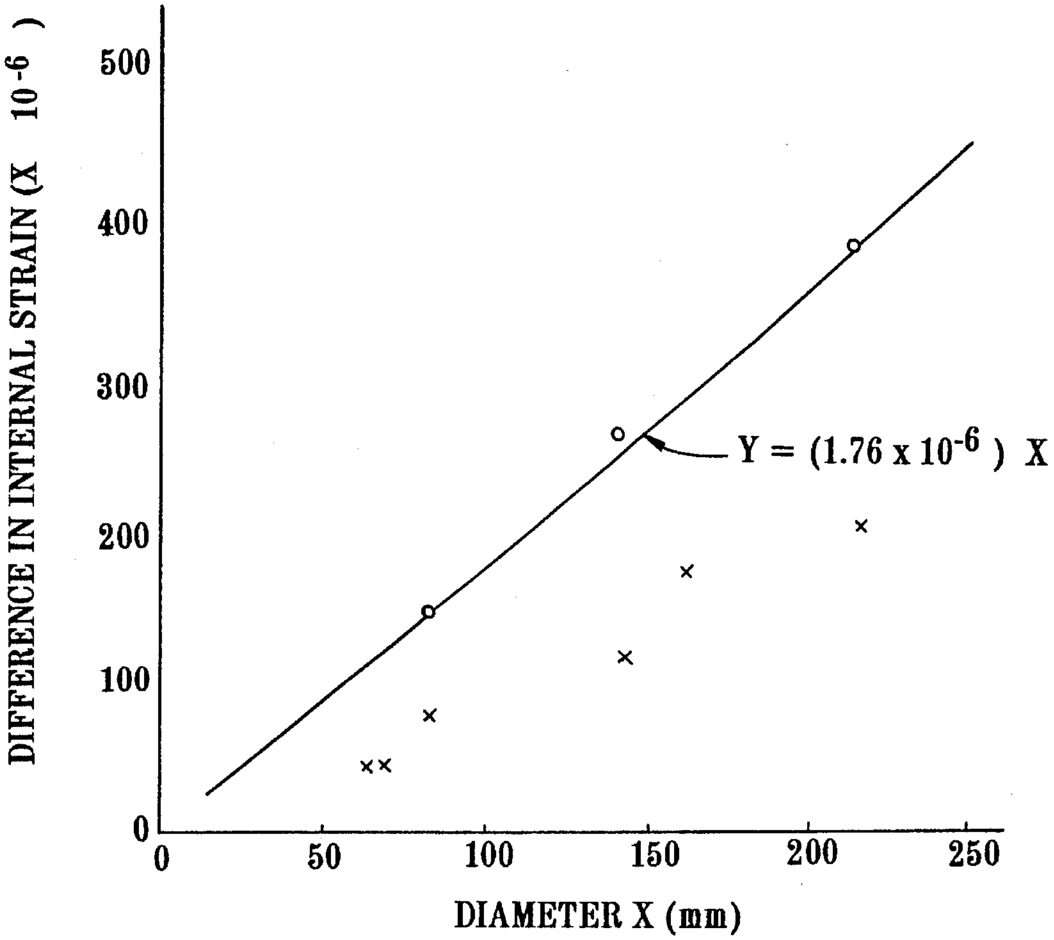
FIG. 13 is a graph showing a strength rate of 50% in relation to the diameter of the insulator body and the difference in internal strain.

In FIG. 13, the differences in internal strain for obtaining the strength rate of 50% in relation to the respective diameters of the insulator bodies are indicated by "○" points. A line connecting the "○" points is represented by the following equation.

$$Y=(1.76\times10^{-6})\,X$$

where Y represents the differences in internal strain and X(mm) represents the respective diameters of the insulator bodies. For obtaining the insulator bodies at the strength rate of more than 50%, it is, therefore, required to satisfy the following formula.

$$Y\geqq(1.76\times10^{-6})\,X$$

In the graph of FIG. 13, "x" points each represent a relationship between the diameter and the difference in internal strain in conventional insulators the strength rate of which is less than 50%. Thus, it will be understood that the difference in internal strain in the insulators of more than the strength rate of 50% is extremely large.

EXAMPLE 3

Cooling speed in relation to the diameter and the difference in internal strain of the insulator bodies will now be explained In this embodiment, various kinds of insulator bodies different in diameter were sintered and cooled under the same condition as in the Example 1 except for the cooling speed at the cooling process to manufacture various kinds of solid insulators different in diameter and internal strain. Thus, the cooling speed was measured in relation to the diameter and tile difference in internal strain of the insulators.

Peculiar cooling temperature region

Figure 14:
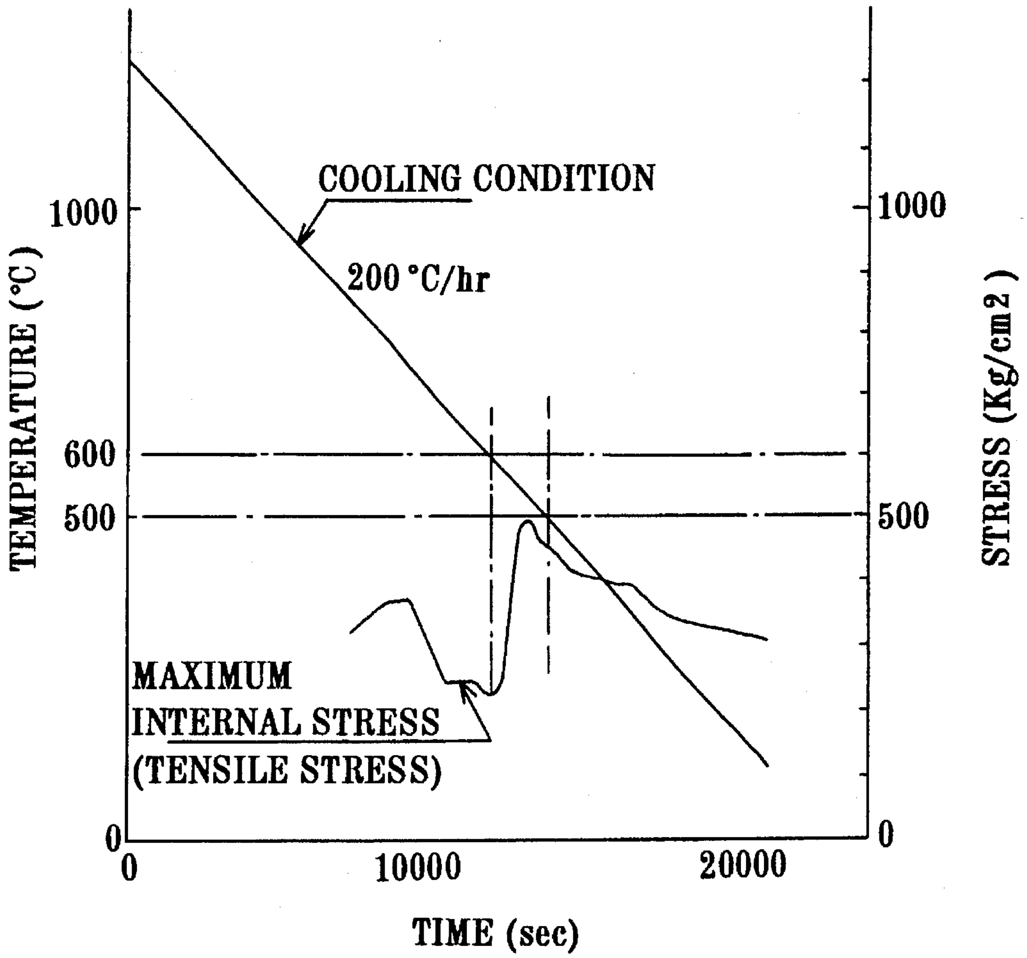
FIG. 14 is a graph showing a maximum internal stress of the insulator body during a cooling process thereof In relation to lapse of a time and the cooling temperature.

To analyze the occurrence condition of a maximum tensile stress caused by thermal stress in a sintered insulator body, an insulator body of 125 mm in diameter was sintered at 1250° C. and cooled at a cooling speed 200° C./hr from the sintered temperature to room temperature. In FIG. 14 there is illustrated a result of the analysis, wherein the internal stress of the insulator body was rapidly increased up to a maximum value at the cooling temperature region from 600° C. to 500° C. In this respect, it has been found that such an increase of the internal stress is caused by rapid change of a thermal expansion coefficient when the quartz in the component of the sintered insulator body is transformed from the β type to the α type.

Accordingly, the cooling temperature region from 600° C. to 500° C. during the cooling process is deemed as a peculiar cooling temperature region where there will occur cooling cracks if the sintered insulator body is quenched. For this reason, it is required to investigate the cooling condition at the peculiar cooling temperature region distinctly from those at the preceding and following cooling temperature regions. Thus, the cooling process was divided into a first cooling temperature region from the sintering temperature to 600° C., a second cooling temperature region from 600° C. to 500° C. and a third cooling temperature region from 500° C. to room temperature to investigate each average cooling speed at the cooling temperature regions.

Average cooling speed in the first cooling temperature region

Figure 15:
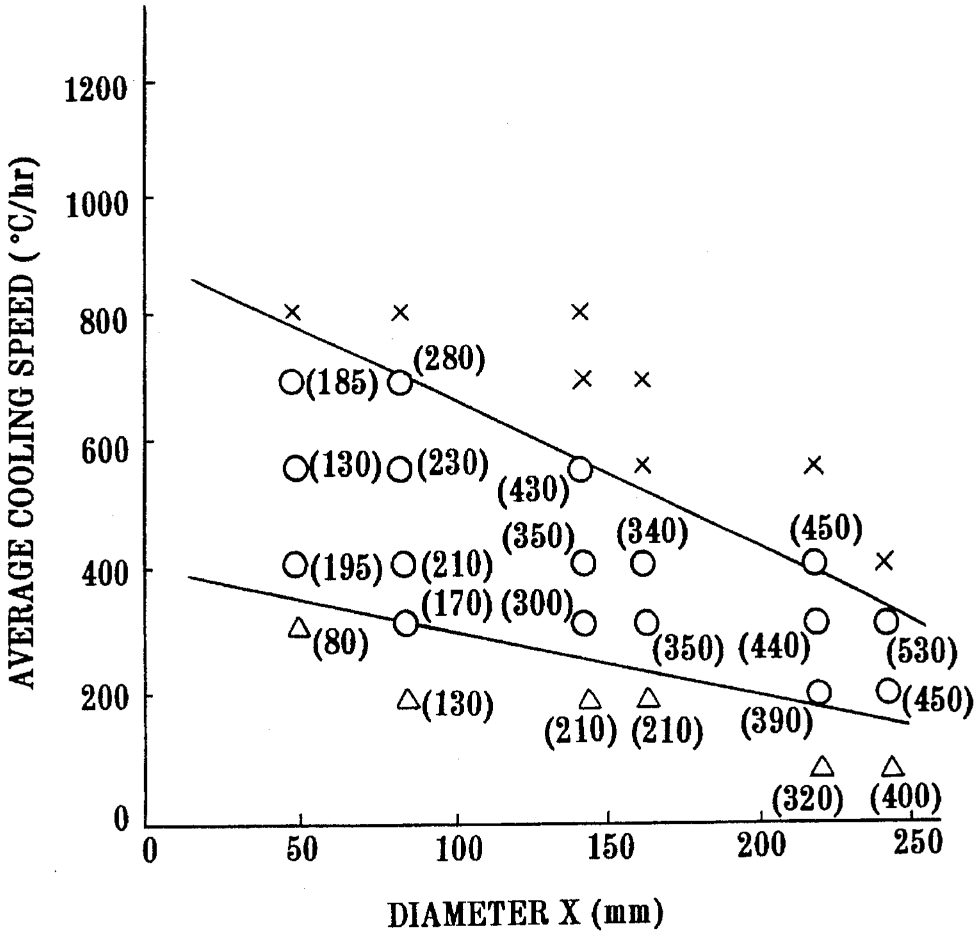
FIG. 15 is a graph showing average cooling speeds at the first cooling temperature region in relation to the diameter of the insulator body.

To manufacture solid insulators by cooling various kinds of insulator bodies sintered at 1250° C., an average cooling speed at the first cooling temperature region from the sintering temperature to 600° C. was determined to be Za(° C./hr), an average cooling speed at the second cooling temperature region from 600° C. to 500° C. was determined to be 10° C./hr, and an average cooling speed at the third cooling temperature region from 500° C. to the room normal temperature was determined to be 50° C./hr. At the second and third cooling temperature regions, the average cooling speeds were determined to avoid the occurrence of cooling cracks in the sintered insulator bodies. In FIG. 15, differences in internal strain of the insulator bodies are shown in relation to the diameter X of the insulator bodies and the average cooling speeds. Each value of the differences in internal strain is indicated in parenthesis. In FIG. 15, "x" points represent occurrence of cooling cracks at the first cooling temperature region, "○" points represent differences in internal strain (more than the strength rate of 50%) defined by the formula "$Y>1.76\times10^{-6}$) X without causing any cooling crack, and "Δ" points represent differences in internal strain (less than the strength rate of 50%) defined by the formula "$Y<(1.76\times10^{-6})$ X. Thus, the average cooling speed Za at the first cooling temperature region for manufacturing a solid insulator at a high strength rate without causing any cooling crack is defined by the following formula:

$$-1.0X+400\leqq Za\leqq -2.4X+900$$

Average cooling speeds at the second and third cooling temperature regions

To produce solid insulators by cooling various insulator bodies different in diameter sintered at 1250° C., an average cooling speed of the insulator bodies of less than 150 mm in diameter at the first cooling temperature region from the sintering temperature to 600° C. was determined to be 400° C./hr, and an average cooling speed of the insulator bodies of more than 150 mm in diameter was determined to be 250° C./hr. An average cooling speed of the insulator bodies at the second cooling temperature region from 600° C. to 500° C. was determined to be Zb ° C./hr, and an average cooling speed of the insulator bodies at the third cooling temperature region from 500° C. to room temperature was determined to be 50° C./hr. In addition, the average cooling speeds at the first and third cooling temperature regions were determined to avoid the occurrence of cooling cracks in the insulator bodies.

Figure 16:
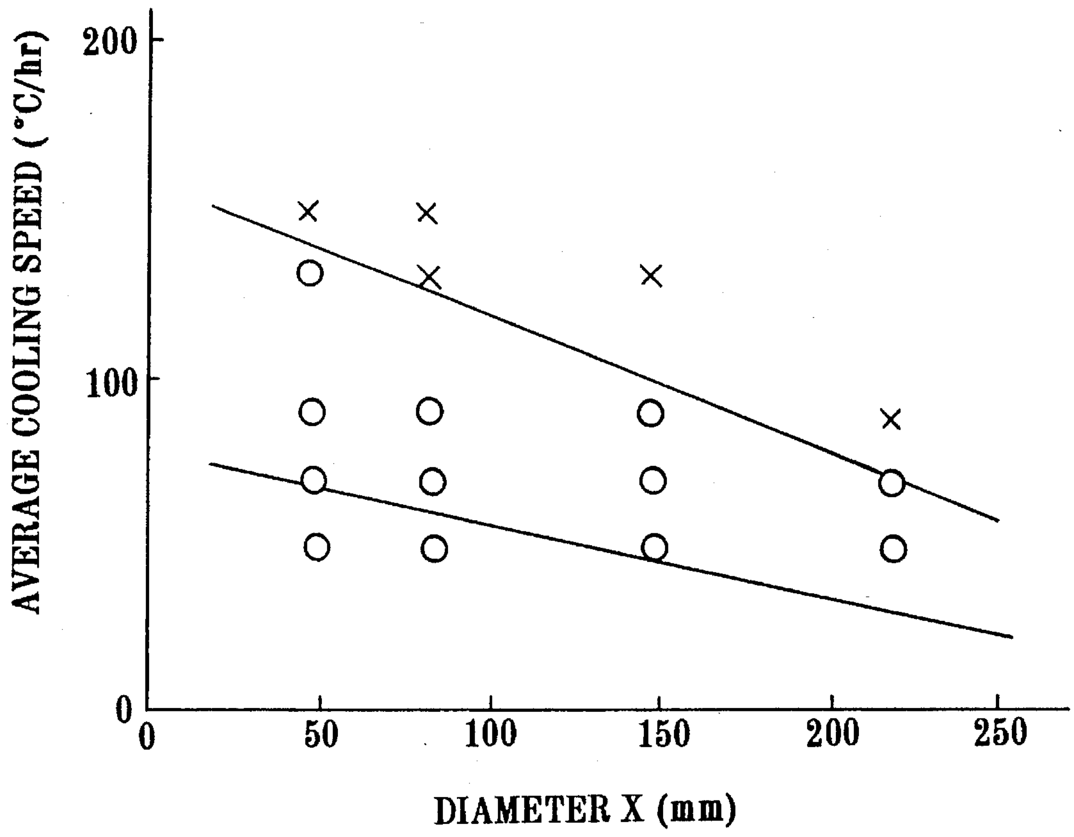
FIG. 16 is a graph showing average cooling speeds at the second cooling temperature region in relation to the diameter of the insulator body.

In FIG. 16, differences in internal strain are shown in relation to the diameter X of the insulator bodies and the average cooling speed Zd. In FIG. 16, "x" points represent the occurrence of cooling cracks at the second cooling temperature region, "○" points represent nonexistence of cooling cracks. Accordingly, the average cooling speed Zb at the second cooling temperature region for manufacturing a solid insulator at a high strength rate without causing any cooling crack is defined to satisfy the following formula:

$$Zb\leqq -0.45X+160$$

In this case, however, the time required for the cooling process will become a long time if the average cooling speed Zb is determined to be a lower speed. It is, therefore, required to determine the average cooling speed more than an appropriate value in accordance with the diameter of the insulator body. In actual practices, a lower limit value of the average cooling speed Zb is defined to satisfy the following formula:

$$-0.25X+80\leqq Zb$$

It is, therefore, preferable that the average cooling speed at the second cooling temperature region is defined to satisfy the following formula:

$$-0.25X+80\leqq Zb\leqq -0.45X+160$$

In the case that the foregoing cooling conditions are adapted in the first and second cooling temperature regions, it is not necessary to quench the sintered insulator body at the third cooling temperature region of from 500° C. to the room temperature. It is, therefore, preferable that the average cooling speed Zc at the third cooling temperature region is defined to be equal to or more than the average cooling speed Zb at the second cooling temperature region as in the following formula:

$$Zb\leqq Zc$$

We claim:

1. A columnar solid insulator body comprising one of (i) cristobalite porcelain containing 10 wt % or less cristobalite crystals and (ii) non-cristobalite porcelain, said body being produced by a method comprising the steps of:

sintering a green solid insulator body at a temperature higher than 1000° C.;

cooling the sintered solid insulator body within a first cooling temperature region from the sintering temperature to 600° C., a second cooling temperature region from 600° C. to 500° C., and a third cooling temperature region from 500° C. to room temperature, wherein an average cooling speed Za ° C./hr within the first cooling temperature region is determined in relation to the diameter X, in mm, of the solid insulator body, and is equal to {$-1.0X+400\leqq Za\leqq -2.4X+900$}, an average cooling speed Zb ° C./hr within the second cooling temperature region is equal to {$-0.25X+80\leqq Zb\leqq -0.45X+160$}, and an average cooling speed Zc ° C./hr within the third cooling temperature region is greater than or equal to Zb;

wherein strain within a diametrically outer portion of the insulator body is greater than strain within a diametrically inner portion of the insulator body, such that the insulator body as a whole is in compression, and a difference, Y, between strain in the diametrically outer portion and strain in a diametrically central portion is $Y\leqq(1.76\times10^{-6})$ X, wherein X is the diameter of the columnar solid insulator and ranges from 20 mm to about 250 mm.

2. A method of manufacturing a solid insulator body, comprising the steps of:

sintering a green solid insulator body at a temperature higher than 1000° C.;

cooling the sintered solid insulator body within a first cooling temperature region from the sintering temperature to 600° C., a second cooling temperature region from 600° C. to 500° C., and a third cooling temperature region from 500° C. to room temperature, wherein an average cooling speed Za ° C./hr within the first cooling temperature region is determined in relation to the diameter X, in mm, of the solid insulator body, and is equal to $\{-1.0\ X+400 \leqq Za \leqq -2.4\ X+900\}$, an average cooling speed Zb ° C./hr within the second cooling temperature region is equal to $\{-0.25\ X+80 \leqq Zb \leqq -0.45\ X+160\}$, and an average cooling speed Zc ° C./hr within the third cooling temperature region is greater than or equal to Zb.

* * * * *